United States Patent
Rubinstein et al.

(10) Patent No.: US 7,220,067 B2
(45) Date of Patent: May 22, 2007

(54) CABLE SPLICE PROTECTOR

(75) Inventors: Scott A. Rubinstein, League City, TX (US); Ben A. Donnell, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 137 days.

(21) Appl. No.: 10/904,712

(22) Filed: Nov. 24, 2004

(65) Prior Publication Data

US 2005/0213898 A1    Sep. 29, 2005

Related U.S. Application Data

(60) Provisional application No. 60/555,903, filed on Mar. 24, 2004.

(51) Int. Cl.
*G02B 6/255* (2006.01)

(52) U.S. Cl. ............... 385/99; 385/95; 367/25; 367/64

(58) Field of Classification Search ......... 385/95, 385/99; 367/25, 64
See application file for complete search history.

(56) References Cited

U.S. PATENT DOCUMENTS

| | | | | |
|---|---|---|---|---|
| 4,227,770 A | * | 10/1980 | Gunn | 385/103 |
| 4,390,186 A | | 6/1983 | McGee et al. | 277/322 |
| 4,690,437 A | | 9/1987 | Anderson, Jr. | |
| 4,751,965 A | | 6/1988 | Cassity | 166/182 |
| 4,776,618 A | | 10/1988 | Barree | |
| 4,784,459 A | * | 11/1988 | Jenkins | 385/55 |
| 4,787,656 A | | 11/1988 | Ryder | |
| 4,789,759 A | | 12/1988 | Jones | |
| 4,791,987 A | | 12/1988 | Cassity et al. | 166/182 |
| 5,070,942 A | | 12/1991 | McInnes | 166/115 |
| 5,148,870 A | | 9/1992 | Fernandez et al. | 166/344 |
| 5,211,226 A | | 5/1993 | Hendrickson et al. | 166/118 |
| 5,224,715 A | | 7/1993 | Downes et al. | 277/322 |
| 5,241,611 A | * | 8/1993 | Gould | 385/70 |
| 5,464,063 A | | 11/1995 | Boehm, Jr. | 166/382 |
| 5,745,633 A | | 4/1998 | Giebel | |
| 5,833,490 A | | 11/1998 | Bouldin | 439/462 |

(Continued)

FOREIGN PATENT DOCUMENTS

DE    4016694 A1    12/1991

(Continued)

OTHER PUBLICATIONS

SPE Paper 55996. Rusch, David W. et al., "Use of Pressure Activated Sealants to Cure Sources of Casing Pressure," (Anchorage, Alaska; May 1999).

(Continued)

*Primary Examiner*—Brian Healy
*Assistant Examiner*—Derek L. Dupuis
(74) *Attorney, Agent, or Firm*—Trop, Pruner & Hu, P.C.; Dona C. Edwards; Tim Curington

(57) ABSTRACT

The present invention provides a protector assembly and process for protecting a downhole connection of a line (e.g., fiber optic or electrical) from the wellbore environment. Inside the housing that provides protection from the wellbore environment is a subassembly that provides anchoring to prevent movement of the cables' internal components that may damage the spliced connection.

10 Claims, 5 Drawing Sheets

U.S. PATENT DOCUMENTS

| | | | |
|---|---|---|---|
| 6,056,327 A | 5/2000 | Bouldin et al. | 285/93 |
| 6,510,895 B1 | 1/2003 | Koleilat et al. | 166/208 |
| 6,752,397 B2 | 6/2004 | Kohli et al. | 277/322 |
| 6,931,194 B2 | 8/2005 | Down et al. | |
| 2002/0151209 A1 | 10/2002 | Milanowski | |
| 2003/0098064 A1* | 5/2003 | Kohli et al. | 137/236.1 |
| 2003/0111796 A1* | 6/2003 | Kohli et al. | 277/322 |

FOREIGN PATENT DOCUMENTS

| | | |
|---|---|---|
| GB | 1329620 A | 12/1970 |
| GB | 1543678 A | 6/1977 |
| GB | 2356742 A | 5/2001 |
| GB | 2407630 A | 5/2005 |

OTHER PUBLICATIONS

SPE Paper 59026. Mendoza, Miguel A. et al., "Leak-Sealant in Hydraulic Systems Minimizes Maintenance Costs in Offshore Wells," (Villhermosa, Mexico; Feb. 2000).

SPE Paper 64400. Eaton, M.L. et al., "New Workover and Completion Technology Utilized in Bass Strait,"(Brisbane, Australia; Oct. 2000).

* cited by examiner

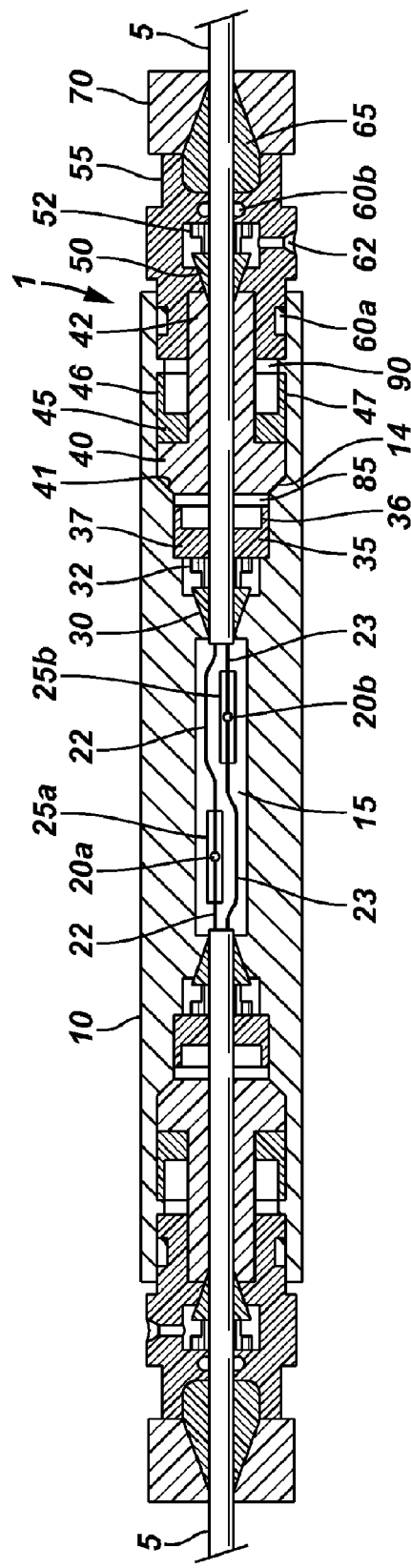
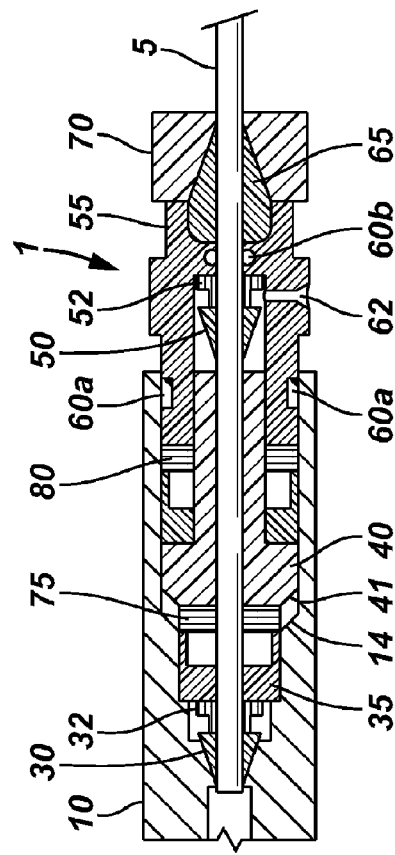

CABLE SPLICE PROTECTOR

CROSS-REFERENCE TO RELATED APPLICATIONS

This claims the benefit under 35 U.S.C. § 119(e) of U.S. Provisional Patent Application Ser. No. 60/555,903, entitled, "CABLE SPLICE PROTECTOR," filed on Mar. 24, 2004.

FIELD OF THE INVENTION

The subject matter of the present invention relates to providing redundant metal-metal seals to protect downhole communication lines from the surrounding environment.

BACKGROUND OF THE INVENTION

Communication lines are used in a wide range of applications in the oilfield industry. The communication lines transmit monitored data regarding downhole conditions such as temperature and pressure to surface instrumentation. The communication lines can also be used to send information down the well from the surface. Additionally, communication lines may also be used to electrically power downhole equipment. Communication lines may include electrical conduits, optical fibers, hydraulic lines and other methods for data or power transmission.

In environments such as those encountered in downhole wells, the communication lines are exposed to hostile conditions such as elevated temperatures and pressures. To protect the fragile communication lines from the hostile conditions, the communication lines are generally carried within protective tubing that provides an environmental seal. Problems arise when the seal must be broken during assembly, installation and/or repair of the communication line. For example, in downhole applications, in order for the communication line to be fed through production equipment such as packers, the line must be cut and then spliced with the downstream line. Thus, after splicing, the communication line must once again be sealed from the harsh environment.

There exists, therefore, a need for an apparatus and method of sealing communication lines from the surrounding environment.

SUMMARY

The present invention relates to methods and apparatus for performing a cable splice and for protecting the splice from the downhole environment and mechanical stresses.

Advantages and other features of the invention will become apparent from the following drawing, description and claims.

BRIEF DESCRIPTION OF THE DRAWINGS

FIG. 1 provides a sketch of a downhole electric splice assembly that incorporates the redundant metal-metal seal assembly.

FIG. 2 provides an illustration of the configuration of the seal assembly 1 used to pressure test the primary seal.

DETAILED DESCRIPTION OF PREFERRED EMBODIMENTS

Figure 3:
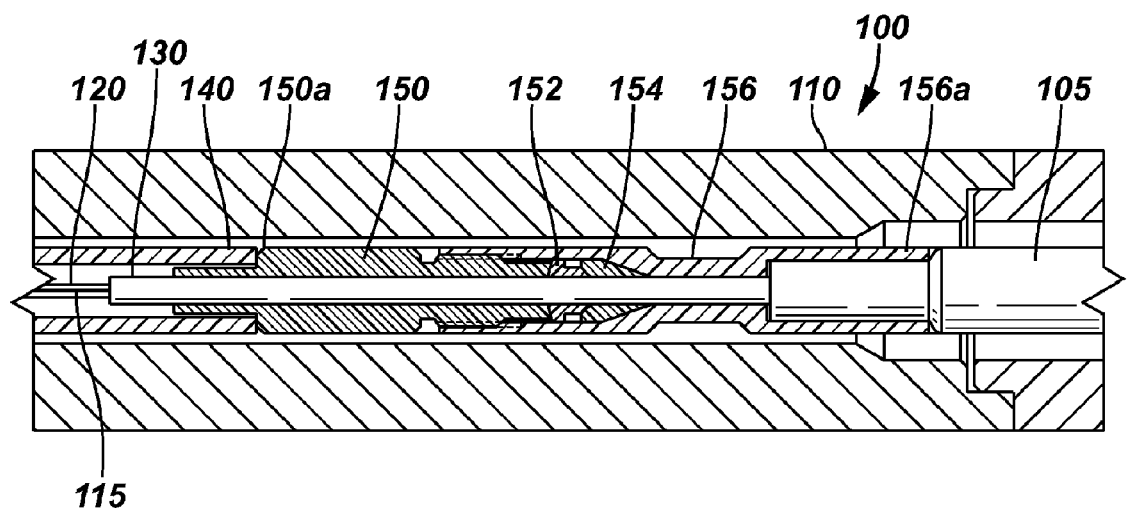
FIG. 3 is a cross-sectional view of an embodiment of the protector assembly of the present invention.

In the following detailed description of the subject matter of the present invention, the apparatus and method of providing redundant metal-metal seals for communication lines is principally described with reference to downhole well applications. Such description is intended for illustration purposes only and is not intended to limit the scope of the present invention. In addition to downhole well applications, the present invention can be used with any number of applications such as pipeline monitoring, subsea well monitoring, and data transmission, for example. Furthermore, the communication lines may comprise electrical wiring, fiber optic wiring, hydraulic lines, or any other type of line, which may facilitate transfer of information, power, or both. All such types of communication lines are intended to fall within the purview of the present invention. However, for purposes of illustration, the present invention will be principally described as being used in downhole well applications.

FIG. 1 provides a sketch of a downhole electric splice assembly that incorporates the redundant metal-metal seal assembly, indicated generally as numeral 1, of the present invention. In FIG. 1, the cables 5 are spliced together within a housing 10. Each of the cables 5 are carrying two communication lines 22, 23 from which spliced connections 20a, 20b are formed. The spliced connections 20a, 20b are located within an internal cavity 15 within the housing 10 and are each housed within protective casings 25a, 25b.

It should be noted that the spliced connections 25a, 25b shown in FIG. 1 are intended to illustrate one possible application of the present invention, and are not intended to limit the inventions scope. The present invention can be used with all types of communication line connections and is not limited to spliced connections.

The primary metal-metal seal is formed by a pair of ferrules 30, 32. The primary seal is energized and held in place by action of the primary retainer 35. In the embodiment shown, the primary retainer 35 comprises securing dogs 36 and a threaded outer diameter 37. The securing dogs 36 correspond to mating dogs on an installation tool (not shown). In one embodiment, the installation tool has a circumferential gap that enables it to be installed and removed over the cable 5. The installation tool is used to apply torque to the primary retainer 35, which in turn imparts a swaging load on the ferrules 30, 32 and imparts contact stress between the ferrules 30, 32 and the cable 5 and between the ferrules 30, 32 and the housing 10. As such, a seal is formed by the ferrules 30, 32 between the housing 10 and the cable 5. The swaging load and contact stress, and thus the seal, is maintained by the threaded outer diameter 37 of the primary retainer 35.

It should be noted that the above description of the primary retainer 35 is exemplary of one particular embodiment of the retainer 35, and is not intended to limit the scope of the invention. There are any number of embodiments of the primary retainer 35 that can be used to advantage in the sealing assembly 1. The primary retainer 35 is any means capable of energizing the ferrules 30, 32 and maintaining the primary seal.

In some instances, to ensure a proper seal, it may be necessary to coat the ferrules 30, 32 with a soft metal such as gold. Typical, cables 5 are characterized by non-circularity or non-uniformity of surface. Although the process of swaging the ferrules 30, 32 on the cable 5 deforms the surface considerably, often it is not enough to provide sufficient local contact stresses between the ferrules 30, 32 and the troughs existing in the surface of the cable 5. Thus, the metal-metal seal cannot withstand a substantial pressure differential for a long duration of time. Coating the ferrules 30, 32 with a soft metal causes the troughs to be filled with the soft metal, substantially increasing the local contact stresses.

The secondary metal-metal seal is formed by a seal element 40 having a conical section 41 that corresponds with a mating section 14 of the housing 10. The secondary metal-metal seal provides redundancy to prevent leakage between the housing 10 and the seal assembly 1. The conical section 41 is forced into sealing contact with the mating section 14 by action of a secondary retainer 45. Similar to the primary retainer 35, the secondary retainer 45 comprises securing dogs 46 and a threaded outer diameter 47. As with the primary retainer 35, an installation tool (not shown) is used to apply torque to the secondary retainer 45, which in turn imparts contact stress between the conical section 41 and the mating section 14 to form a seal there between. The contact stress of the shouldered contact is maintained by the threaded outer diameter 47 of the secondary retainer 45. It should be noted that the primary gap 85 that exists between the primary retainer 35 and the seal element 40 ensures that the process of energizing the secondary metal-metal seal does not affect the contact stresses on the primary seal between the housing 10 and the cable 5. It should further be noted that in one embodiment, the seal element 40 comprises one or more ferrules forced into sealing contact with the mating section 14 of the housing 10.

As discussed above with reference to the primary retainer 35, it should be noted that the description of the secondary retainer 45 is exemplary of one particular embodiment of the retainer 45, and is not intended to limit the scope of the invention. There are any number of embodiments of the secondary retainer 45 that can be used to advantage in the sealing assembly 1. The secondary retainer 45 is any means capable of energizing and maintaining the secondary seal.

The tertiary metal-metal seal is formed by a pair of ferrules 50, 52 that engage the end 42 of the seal element 40. The tertiary metal-metal seal, energized by the end plug 55, provides redundancy to prevent leakage between the cable 5 and the seal assembly 1. As with the ferrules 30, 32 of the primary seal, in certain instances, the ferrules 50, 52 of the secondary seal are coated with a soft metal to increase the local contact stresses with the cable 5. A secondary gap 90 exists between the secondary retainer 45 and the end plug 55 that prevents the energizing load from affecting the mating components on the secondary seal. Load transmitted to the end of the secondary retainer 45 is dissipated through the end plug 55 to the housing 10. The end plug 55 further comprises a pressure port 62 and one or more elastomeric seals 60a, 60b that enable pressure testing (as will be discussed below) of the seal assembly 1.

To isolate all the seals from axial loading, vibration and shock conveyed from the cables 5a, 5b, an anchor 65 is energized against the cable 5 by action of the end nut 70. In one embodiment, the anchor 65 is a collet style anchor.

FIG. 2 provides an illustration of the configuration of the seal assembly 1 used to pressure test the primary seal. Testing of the primary seal requires insertion of spacers 75, 80 to prevent accidentally engaging the secondary and tertiary seals. In one embodiment, the spacers 75, 80 are constructed with a circumferential gap to enable installation and removal from the seal assembly 1. The first spacer 75 prevents the conical section 41 of the seal element 40 from contacting the mating section 14 of the housing 10 to form the secondary metal-metal seal. Likewise, the second spacer 80 prevents the ferrules 50, 52 from engaging the end 42 of the seal element 40 to form a seal. To test, fluid is pumped through the pressure port 62. The fluid is prevented from escaping the housing 10 opposite the primary seal by the one or more elastomeric seals 60a, 60b. After testing, the spacers 75, 80 are removed and the seal cavity is cleared of the test fluid. Subsequently, the secondary and tertiary seals are energized as described above, and the anchor 65 is installed and energized.

In one embodiment, pressure testing of the secondary and tertiary seals is done by pumping a fluid that cures into a gel under downhole conditions through the pressure port 62. After testing, the pressure port 62 is plugged to maintain the gel within the seal assembly 1. The gel protects the secondary and tertiary seals from corrosion due to exposure to completion or produced fluids. Further, the gel acts to protect the seals from the effects of shock and vibration.

Referring back to FIG. 1, one method of verifying successful secondary and tertiary sealing is achieved by use of a chemical that produces an exothermic reaction when exposed to the test fluid. In this method, the chemical is deposited via porous bags into the interior of the housing 10. Failure of either seal causes the test fluid to invade the interior of the housing 10 and the resultant differential temperature increase can be read by thermal strips (not shown) placed on the outer diameter of the housing 10.

Another method of verifying successful secondary and tertiary sealing is to load the interior of the housing 10 with a porous bag containing small hollow beads made of a material that emits noise upon failure. The increase of pressure in the interior of the housing 10 due to a failed seal causes the hollow beads to fail, emitting a sound that can be picked up by a sonic sensor.

Yet another method of verifying successful secondary and tertiary sealing include using an ultrasonic sensor to detect the presence of test fluid in the interior of the housing 10. Similarly, a sonic sensor can be used to detect the change in acoustic response due to test fluid in the interior of the housing 10. A portable x-ray machine can also be used to detect the presence of test fluid in the interior of the housing 10.

The invention being thus described, it will be obvious that the same may be varied in many ways. For example, it is not necessary that one or both gaps 85, 90 exist within the seal assembly 1. The gaps 85, 90 are useful to allow independent loading, prevent undue loading and to enable various pressure testing methods, but are not necessary for the function of the seal assembly 1. Such variations are not to be regarded as a departure from the spirit and scope of the invention, and all such are intended to be included within the scope of the following non-limiting claims.

In another embodiment of the present invention, a connector assembly and deployment system are provided to connect the ends of a fiber optic cable and to protect the fiber optics from the downhole environment. The connector system may be used as a splice to repair damaged fiber optic cable and/or to reconnect cable after passing through a tool such as a packer, and/or in concert with other components to form a Y-Block or turnaround sub. An embodiment of the connector assembly provides features to protect the fiber optics from movement of the internal components of the fiber optic cable that could break the fiber, protection from shock and vibration, along with protection from the well environment.

With reference to FIG. 3, an embodiment of the connector assembly 100 includes a protection device and an anchoring device. More particularly, an embodiment of the protection device of the connector assembly 100 includes a housing 110 for holding a spliced cable 105 having a communication line 115. The communication line 115 may be one or more, optical fibers. This embodiment of the splice utilizes downhole cable that incorporates an inner tube, which is contained within the outer metal jacket of the cable. Alterations or variants of the protection and anchoring schemes contained herein may be applied to variations in cable construction. For instance, anchoring can be achieved on the cable filler material by threading the retainer nut 156 into the filler material thereby gripping the filler rather than sliding over the filler as is shown in FIG. 3. The assembly 100 can also be used selectively where the situation only permits full use of the assembly on one side of the splice. The line 115 is protected by a first tube 120 and a second tube 130, which may be part of the cable construction. The first tube 120 having an outer diameter less then the inner diameter of the second tube 130 such that the first tube can at least partially reside within the second tube. The tube 120 provides a first layer of protection and bridges the gap between the tube 130 contained in the cable halves being spliced. In one embodiment, the first tube 120 is a polytetrafluoroethylene (PTFE) tube and the second tube is an inner metal tube. However, the first and second tube may be fabricated from any material capable of protecting the line 115 including, but not limited to, plastic, metal, PTFE, FEP, PFA, ETFE, PVDF, ECTFE, THV, and so forth. The first tube 120 may cover the entire length of the line 115, the length of the line within the housing 110, or alternatively the length of the line within the housing 110 and not inside the second tube 130. Moreover, an outer protective sleeve 140 is installed over the first tube 120, generally covering the length of tube 120 not within the second tube 130. The sleeve 140 may be slotted to fit over the tube 120 and either slide or snap over the retainer body 150 or shoulder against the cable outer jacket in some instances. In some embodiments, the sleeve 140 may use a form of hydrogen scavenger such as a hydrogen scavenging gel to protect the first tube 120 and line 115 from hydrogen exposure (e.g., hydrogen darkening of fiber optics). A gel may also be used to aid in dampening out mechanical stresses. The sleeve 140 may make up part of the anchoring system described herein.

Still with reference to FIG. 3, an embodiment of the anchoring device of the connector assembly 100 includes a retainer to protect communication line 115 from axial stress such as bidirectional loads (spooling, thermal effects), mechanical vibration, and/or shock that could result in breakage of the communication line. The retainer includes a retainer body 150 positioned over the second tube 130, a pair of ferrules 152, 154, and a retainer nut 156. In one embodiment, the retainer body 150 and retainer nut 156 are a threaded connection. When torque is applied, a swaging load is imparted to the ferrules 152, 154 to impart a contact stress between the ferrules and the second tube 130. As such, loads are transferred from the inner tube 130 through the ferrules 152, 154 and either through the retainer nut 156 and into the cable jacket (which is in turn anchored by the splice cable seal assembly), or through the retainer body, the outer sleeve 140 (via shoulder 150A) and to the opposing side of the splice assembly. The filler is prevented from moving into the splice by the retainer nut, which transfers the load through to retainer body and outer sleeve to be supported by the opposing side of the splice assembly. Movement of the filler may also be retained depending on the interface with the retainer nut.

Another embodiment of the present invention includes a method for performing a cable splice and protecting the splice from the downhole environment and mechanical stresses. While the embodiments of the cable splice and protection method set forth below are described with respect to a fiber optic cable, it is intended that the method may be used to splice and/or protect any cable type including, but not limited to electrical conduits, optical fibers, hydraulic lines and other conduits for data or power transmission. In general, a cable splice may be achieved in accordance with the present invention by preparing the exposed ends of the cables to be spliced, splicing the cable together, and then protecting the splice.

More particularly, in one embodiment of the present invention, a cable splice may be achieved in accordance with the present invention by preparing the left-side cable and communication line therein, preparing the right-side cable and communication line therein, splicing and protecting the communication line, and installing a connector or splice assembly to protect the splice. The splice may be achieved by utilizing a jig, which in this application is a support frame (e.g., a modular platform) that is integral in performing the splice. The jig secures the cables providing a stable work setup, aids in fiber management during assembly, reduces the risks of breaking fiber fusion splices, and aids in the assembly of the optical cable splice cable sealing assemblies. An embodiment of the splice procedure has each cable that is to be spliced positioned and secured into the jig where the jig is arranged in a specific configuration to hold the cables in the required position for splice assembly. While embodiments of the jig are described herein with respect to splicing a cable having one or more fibers therein, the present invention includes other embodiments of the jig may be used for splicing any cable having a communication line whether such communication line is one or more fibers, one or more electrical conductors, or a combination or hybrid thereof.

Figure 4:
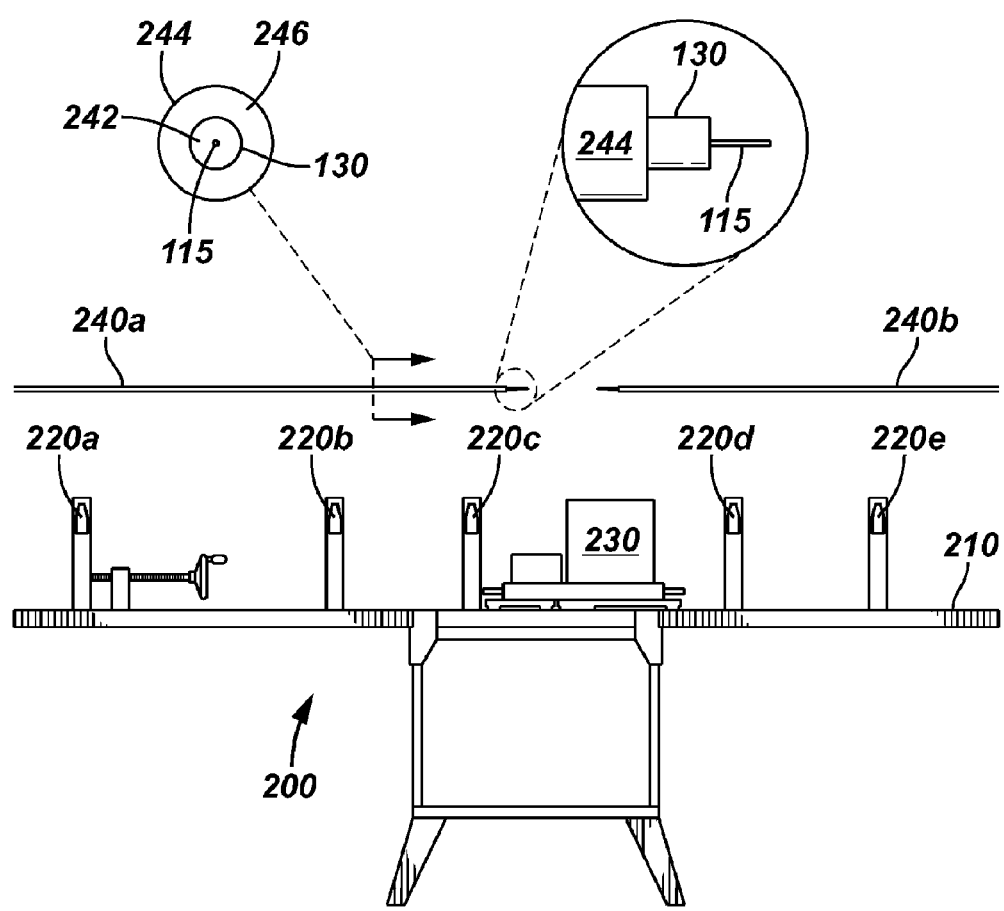
FIG. 4 is a profile view of an embodiment of the workstation for use in forming the cable splice of the present invention.

With respect to FIG. 4, an embodiment of the connection method includes providing a workstation 200 including a jig 210 with posts 220A, 220B, 220C, 220D, 220E and a splicing device 230 (e.g., fusion splicer in this illustration enclosed in a purge box) for connecting a left-side cable 240A to a right-side cable 240B. An embodiment of the jig 210 may include a tray arranged between the posts 220A, 220B, 220C and the posts 220D, 220E for supporting the splicing device 230 and permitting it to slide into position to perform the fiber splice and back out of position to allow room to work without disturbing the fibers. While the embodiment described herein includes a jig having five support posts it is intended that any number of posts may be used to support the cable and communication line therein. Moreover, the terms left and right side are not intended to limit the cable but instead are merely used for illustrative purposes to reference two cables in the process of being spliced. The cables 240A, 240B may be any conventional cable requiring splicing. For example, the cables 240A, 240B may be fiber optic cables, each having a fiber optic line 115 surrounded by an inner metal tube 130 (e.g., nickel-chromium alloy or steel). A gel 242, such as a hydrogen scavenging gel, may be present between the fiber optic line 115 and the inner metal tube 130. A metal jacket 244 (e.g., nickel-chromium alloy or steel) may surround and protect the inner metal tube 130, and a filler material 246 may be arranged between the jacket 244 and the inner metal tube 130.

Figure 5:
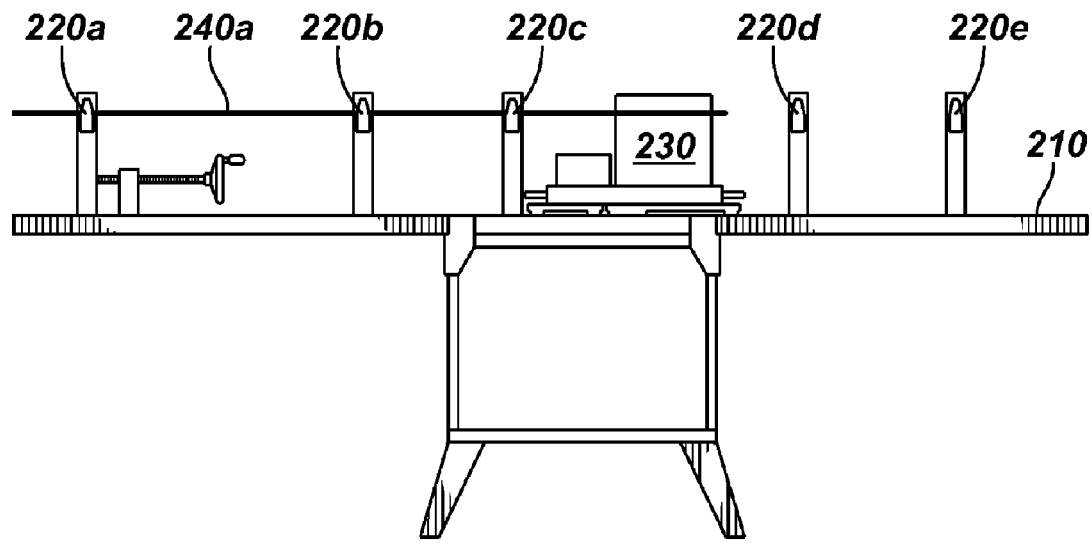
FIG. 5 is a profile view of an embodiment of the left cable setup in the jig for use in forming the cable splice of the present invention.
Figure 6:
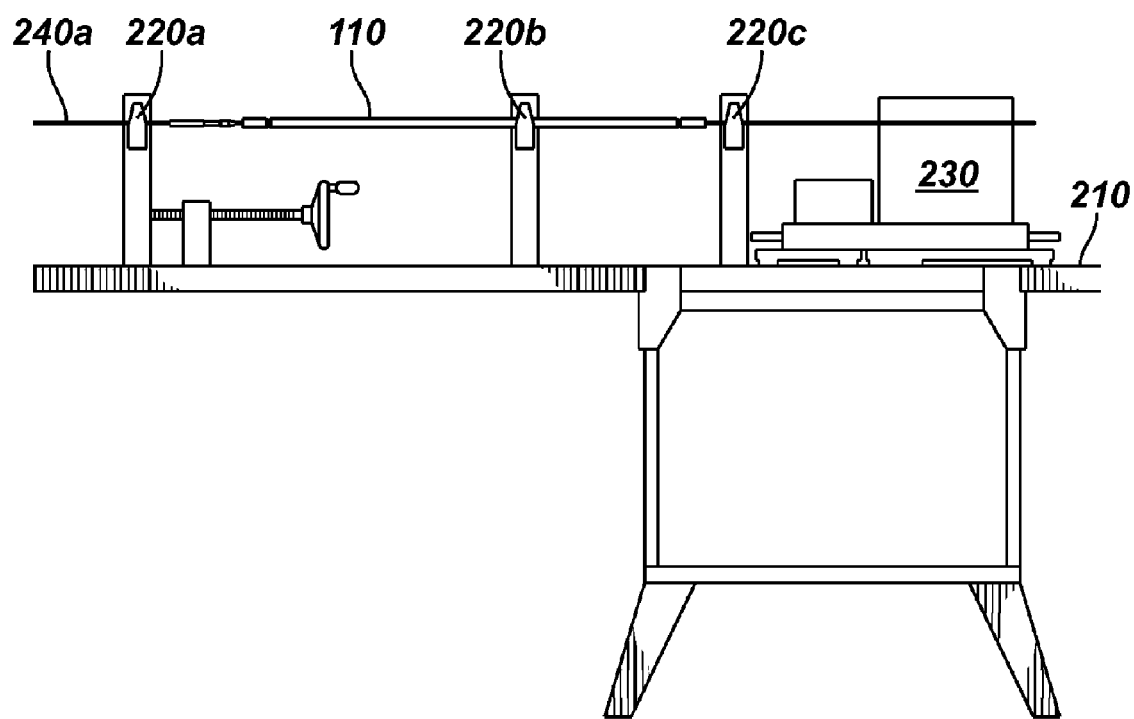
FIG. 6 is a profile view of an embodiment of the positioning of the connector and protector assembly for use in forming the cable splice of the present invention.
Figure 7:
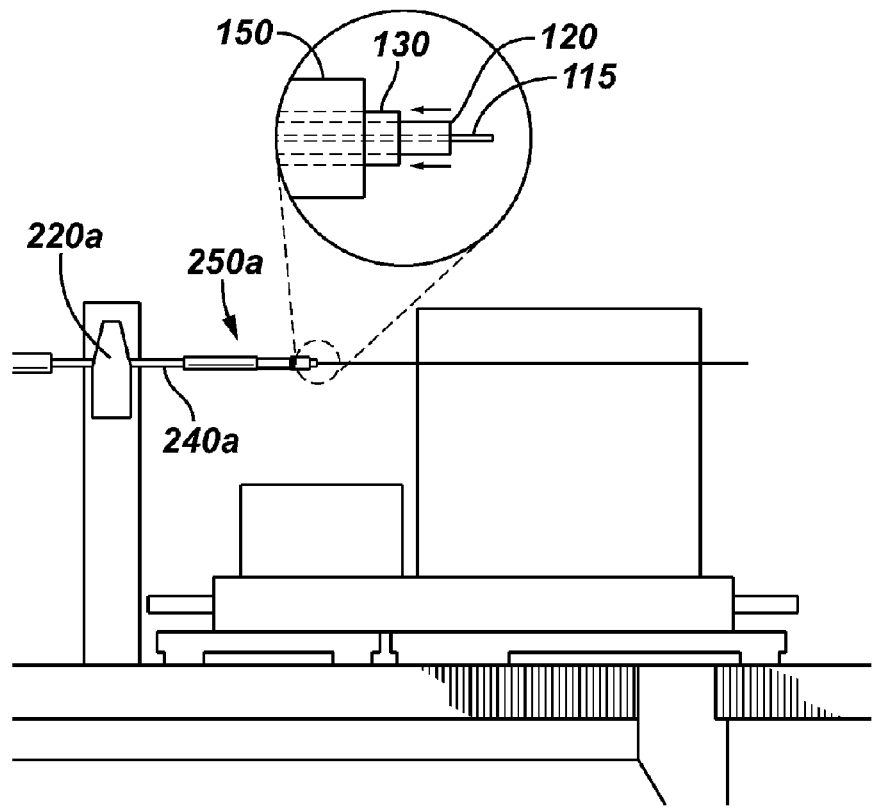
FIG. 7 is an enlarged profile view of an embodiment of the left cable setup in the jig for use in forming the cable splice of the present invention.

FIGS. 5–7 illustrate the preparation of the left-side cable 240A. The left-side cable 240A is positioned so that the cable extends a given length past the inner face of post 220C and is clamped into post 220A. A prearranged seal stack, as described above and shown in FIG. 1, and a connector housing 110 are slid onto the cable past post 220C. The connector housing is held by post 220B with the cable also held at 220C. The metal jacket 244 and filler material 246 of left-side cable 240A are then cut and removed a given distance from the inner face of post 220C. Then, the inner metal tube retainer components 250A are slid over the inner metal tube in the following order: retainer nut 156, front ferrule 154, back ferrule 152, and retainer body 150 (see also FIG. 3). In this arrangement, the retainer nut 156 preferably sits flush with the cable metal jacket 244 and the retainer nut 156 is tightened to the retainer body 150, but is not swaged at this time.

With respect to FIG. 7, preparing the fiber 115 of the left-side cable 240A includes first removing the inner metal tube 130 starting at the end of the inner metal tube retainer body 150. The fiber end may be glued into the end of a small gauge tube over which lies the protective tube 120. The small gauge tube, as held by a device such as a pin vise, keeps the fiber straight while the protective tube is slid over the fiber. This step may be employed to aid in preventing fiber breakage. The pin vise can be held in place using a jig post. This keeps the fiber stable and not prone to breakage from an individual's inability to hold the pin vise steady. While the fiber 115 is stabilized so that there is no slack in the fiber, the protective tube 120 is pulled over the fiber 115 and inserted into the inner metal tube 130 until only a small given length of the protective tube extends past the end of the inner metal tube.

Figure 8:
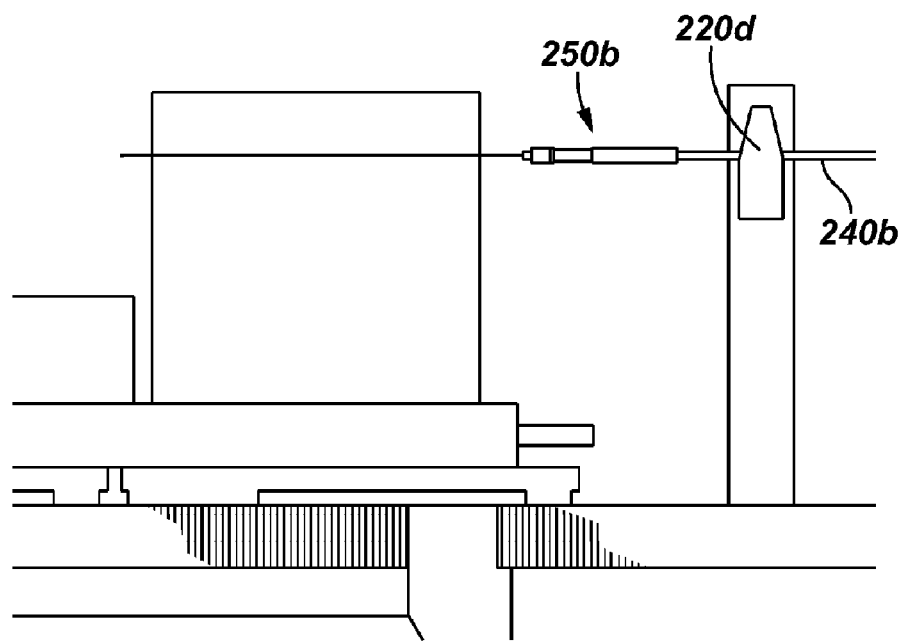
FIG. 8 is an enlarged profile view of an embodiment of the right cable setup in the jig for use in forming the cable splice of the present invention.

FIG. 8 illustrates the preparation of the right-side cable 220B, which is achieved using similar steps as described above with respect to the left-side cable 220A. The right-side cable 220B is loaded into position so that the cable extends a given length past the inner face of post 220D and is clamped onto post 220E (FIG. 4). A prearranged seal stack, as described above and shown in FIG. 1, and a connector outer housing 110 are slid onto the cable 240B. The metal jacket 244 and filler material 246 of right-side cable 240B are then cut and removed a given distance from the inner face of post 220D. Then, the inner metal tube retainer components 250B are slid over the inner metal tube in the following order: retainer nut 156, front ferrule 154, back ferrule 152, and retainer body 150 (see also FIG. 3). In this arrangement, the retainer nut 156 preferably sits flush with the cable metal jacket 244 and the retainer nut 156 is tightened to the retainer body 150, but is not swaged at this time.

Figure 9:
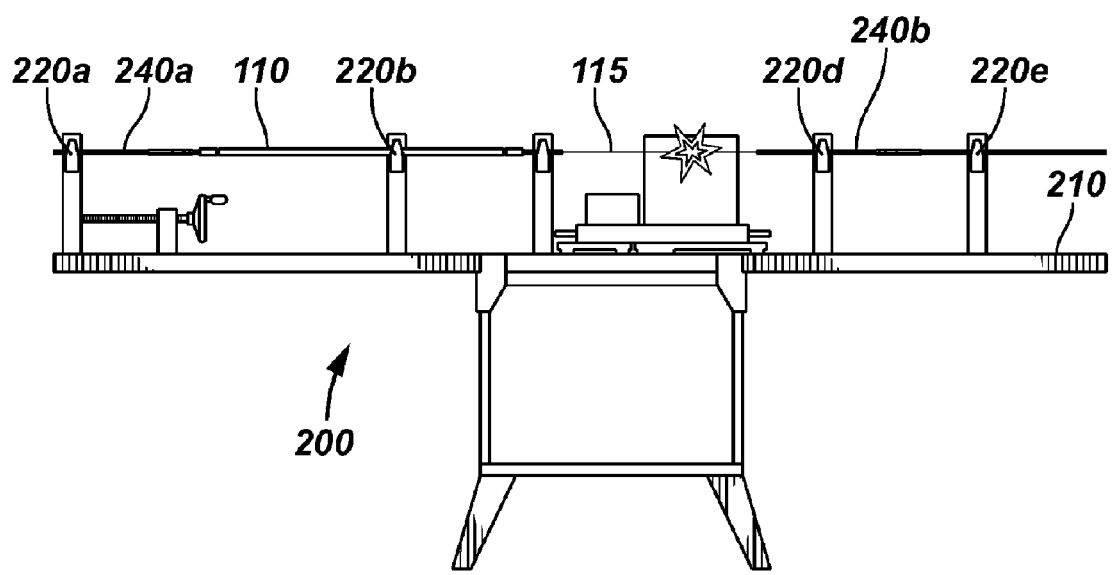
FIG. 9 is a profile view of an embodiment of the fusion splicing as used in forming the cable splice of the present invention.

FIG. 9 illustrates the fiber optic splice. First, if there are mixed multimode and single mode fibers, then the fibers must be identified so that different fiber types are not fused together. Generally, circumstances dictate the type and quantity of fiber in the cable. For certain situations (e.g., for cables that include polyimide coated fiber or for operations without a hot work permit), heated solvent must be used to remove the fiber coating. Acrylate coatings can be removed, such as by using either thermal strippers or solvent. Next, the fibers are cleaved. In one embodiment of the method of the present invention, the workstation includes a fiber cleaver (not shown) arranged atop the fusion splicer 230. This allows all fibers (in cases of multiple fiber cables) to be cleaved to virtually identical lengths. The fibers may then be spliced using a fusion splicer 230.

In some embodiments of the splicing method of the present invention, it may be necessary to identify the fibers before splicing. If identification is necessary, the cleaved end of the fiber may be viewed using a microscope to identify the fiber by the diameter of the core. For example, a single mode fiber core may be approximately 8.4 to 9 mm while a multimode core may be approximately 50 to 62.5 mm. The size of the core relative to the cladding diameter makes identification clear. When splicing multiple fibers, the jig may provide features that permit fiber management so that fibers are secured out of the immediate work area thereby preventing accidental breakage while also maintaining the individual identity of each fiber.

Figure 10:
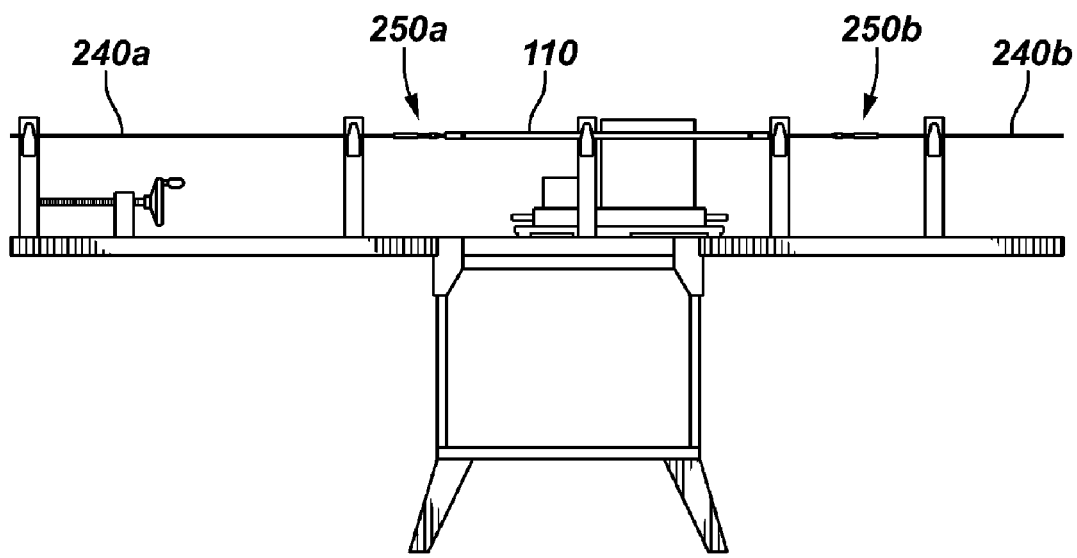
FIG. 10 is a profile view of an embodiment of the splice housing and sealing assemblies positioning as used in forming the cable splice of the present invention.

FIG. 10 illustrates the installation of the fiber splice protection. After the fiber 115 is spliced, the adjustable jig post 210 is used to remove slack from the fiber, but not so much as to put tension on the fiber. The jig permits controlled movement of the cable without releasing the cable. As post 210 is moved outward along the jig, the cable is drawn through the secured splice housing. If the cable was moved manually in the jig or without the jig, there is a potential to break the fragile fusion splice. Then, the protective tube 120 (FIG. 7) is carefully pulled from the left-side cable 240A over the bare fiber 115 and inserted a given length into the inner metal tube 130 of the right-side cable 240B. Next, each inner metal tube retainer 250A, 250B is tightened and an outer protective sleeve 140 (FIG. 3) is arranged (and cut if necessary) to fit closely between the retainer bodies 150 of retainers 250A and 250B, and a gel is injected in the sleeve 140 to suspend and further protect the fiber 115. Finally, the splice housing 110 is slid over the outer protective sleeve 140 and secured in a jig post. The seal assemblies may then be made up.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An assembly for use in a wellbore, comprising:
a downhole cable having a splice, wherein the cable further comprises a communication line, a first tubular member around the communication line, and a second tubular member, wherein the first tubular member at least partially resides within the second tubular member;
a retainer connected to the cable proximate the splice, the retainer to impart a swaging load in response to an applied torque to clamp the retainer to the second tubular member to prevent axial stress in the cable from affecting the splice;

an outer protective sleeve installed around the first tubular member to cover a length of the first tubular member not in the second tubular member, the outer protective sleeve attached to the retainer; and a housing to contain the cable, retainer, and outer protective sleeve, wherein the retainer comprises:

a retainer body defining a bore therein for receiving the second tubular member of the cable;

a retainer nut defining a bore therein for receiving the second tubular member of the cable, the retainer nut adapted to engage the retainer body; and a pair of ferrules each defining a bore therein for receiving the second tubular member of the cable, the pair of ferrules arranged between the retainer body and the retainer nut, the pair of ferrules adapted to impart the swaging load to clamp the retainer body to the second tubular member as the retainer nut is torqued.

2. The assembly of claim 1, wherein the second tubular member of the cable comprises an inner metal tube.

3. The assembly of claim 1, wherein the communication line is a fiber optic line.

4. An apparatus for protecting a splice in a cable for use in a wellbore, comprising:

a cable having a communication line and having a splice in the cable;

an anchor assembly arranged along the cable proximate the splice, the anchor assembly adapted to substantially prevent axial stress in the cable from affecting the splice; and a protector assembly arranged around the splice, the protector assembly adapted to substantially seal the splice from communication with the wellbore, wherein the protector assembly comprises:

inner and outer tubular members that are pan of the cable, wherein the inner tubular member surrounds the communication line and at least partially resides within the outer tubular member;

an outer protective sleeve installed around the inner tubular member to cover a length of the inner tubular member not in the outer tubular member, the outer protective sleeve attached to the anchor assembly, wherein the anchor assembly imparts a swaging load in response to an applied torque to clamp the anchor assembly to the outer tubular member; and a housing assembly to contain the cable, anchor assembly, and outer protective sleeve, wherein the anchor assembly comprises:

a retainer body defining a bore therein for receiving the outer tubular member of the cable;

a retainer nut defining a bore therein for receiving the outer tubular member of the cable, the retainer nut adapted to engage the retainer body; and a pair of ferrules each defining a bore therein for receiving the outer tubular member of the cable, the pair of ferrules arranged between the retainer body and the retainer nut, the pair of ferrules adapted to impart the swaging load to clamp the retainer body to the outer tubular member as the retainer nut is torqued.

5. The apparatus of claim 4, further comprising a hydrogen scavenging gel residing between the inner tubular member and the outer protective sleeve, the hydrogen scavenging gel to protect the communication line from hydrogen exposure.

6. The apparatus of claim 4, wherein the outer tubular member of the cable is an inner metal tube.

7. The apparatus of claim 4, wherein the inner tubular member of the cable is fabricated from one of PTFE, FEP, PFA, ETFE, PVDF, ECTFE, and THV.

8. The apparatus of claim 4, wherein the communication line is a fiber optic line.

9. An assembly for use in a wellbore, comprising:

a downhole cable having a splice, wherein the cable further comprises a communication line, a first tubular member around the communication line, and a second tubular member, wherein the first tubular member at least partially resides within the second tubular member;

a retainer connected to the cable proximate the splice, the retainer to impart a swaging load in response to an applied torque to damp the retainer to the second tubular member to prevent axial stress in the cable from affecting the splice;

an outer protective sleeve installed around the first tubular member to cover a length of the first tubular member not in the second tubular member, the outer protective sleeve attached to the retainer;

a housing to contain the cable, retainer, and outer protective sleeve; and a hydrogen scavenging gel residing between the first tubular member and the outer protective sleeve, the hydrogen scavenging gel to protect the communication Line from hydrogen exposure.

10. A method of protecting a splice in a cable having a communication line for use in a wellbore, comprising:

connecting an anchor assembly to the cable to prevent axial stress in the cable from affecting the splice;

providing the cable with inner and outer tubular members, wherein the inner tubular member surrounds the communication line and at least partially resides within the outer tubular member, and wherein the anchor assembly imparts a swaging load in response to an applied torque to clamp the anchor assembly to the outer tubular member;

installing an outer protective sleeve around the inner tubular member to cover a length of the inner tubular member nor in the outer tubular member, the outer protective sleeve attached to the anchor assembly;

providing a housing to contain the cable, anchor assembly, and outer protective sleeve; and providing a hydrogen scavenging gel residing between the inner tubular member and the outer protective sleeve, the hydrogen scavenging gel to protect the communication line from hydrogen exposure.

* * * * *